US008167483B2

(12) United States Patent
Jensen

(10) Patent No.: US 8,167,483 B2
(45) Date of Patent: May 1, 2012

(54) TEMPERATURE MEASUREMENT INSTRUMENTS AND METHODS FOR IDENTIFYING A SELECTED TARGET AREA

(75) Inventor: John Steffen Jensen, Santa Cruz, CA (US)

(73) Assignee: Fluke Corporation, Everett, WA (US)

( * ) Notice: Subject to any disclaimer, the term of this patent is extended or adjusted under 35 U.S.C. 154(b) by 695 days.

(21) Appl. No.: 12/354,104

(22) Filed: Jan. 15, 2009

(65) Prior Publication Data

US 2010/0179785 A1    Jul. 15, 2010

(51) Int. Cl.
*G01J 5/00* (2006.01)
*G01J 5/02* (2006.01)
(52) U.S. Cl. .................. 374/120; 374/121; 250/338.1
(58) Field of Classification Search .................. 374/120, 374/121; 250/338.1
See application file for complete search history.

(56) References Cited

U.S. PATENT DOCUMENTS

| 4,315,150 | A | * | 2/1982 | Darringer et al. ......... 250/338.1 |
| 4,527,896 | A | * | 7/1985 | Irani et al. ................ 356/43 |
| 5,011,296 | A | * | 4/1991 | Bartosiak et al. ......... 374/131 |
| 5,208,528 | A | * | 5/1993 | Quintard .................. 324/750.03 |
| 5,345,304 | A | | 9/1994 | Allen |
| 5,352,039 | A | | 10/1994 | Barral et al. |
| 5,368,392 | A | | 11/1994 | Hollander et al. |
| 5,626,424 | A | | 5/1997 | Litvin et al. |
| 5,710,428 | A | * | 1/1998 | Ko ......................... 250/332 |
| 5,727,880 | A | * | 3/1998 | Hollander et al. ......... 374/121 |
| 5,796,474 | A | | 8/1998 | Squire et al. |
| 5,823,678 | A | | 10/1998 | Hollander et al. |
| 5,836,694 | A | | 11/1998 | Nguyen |
| 5,839,829 | A | | 11/1998 | Litvin et al. |
| 6,359,681 | B1 | | 3/2002 | Housand et al. |
| 6,585,409 | B2 | | 7/2003 | Schmidt et al. |
| 6,741,341 | B2 | | 5/2004 | DeFlumere |
| 6,836,320 | B2 | | 12/2004 | Deflumere et al. |
| 7,034,300 | B2 | | 4/2006 | Hamrelius et al. |
| 7,355,178 | B2 | * | 4/2008 | Everest .................. 250/338.1 |
| 7,365,326 | B2 | * | 4/2008 | Wood ..................... 250/332 |
| 7,446,315 | B1 | * | 11/2008 | Tidwell .................. 250/338.1 |
| 7,457,441 | B2 | * | 11/2008 | Hartlove .................. 382/117 |
| 7,515,986 | B2 | * | 4/2009 | Huskamp .................. 700/207 |
| 7,693,679 | B1 | * | 4/2010 | Warnke et al. ............ 702/132 |
| 7,795,583 | B1 | * | 9/2010 | Hubbard et al. .......... 250/338.1 |

(Continued)

FOREIGN PATENT DOCUMENTS

JP    2000159315 A    5/2000

(Continued)

OTHER PUBLICATIONS

Abstract for JP 2000159315, May 15, 2000, 1 page.

(Continued)

*Primary Examiner* — Christopher Fulton
(74) *Attorney, Agent, or Firm* — Fredrikson & Byron, PA

(57) ABSTRACT

Temperature measurement instruments and methods are provided for visually identifying a selected area of a target with a light beam. After imaging infrared radiation from a measurement area on a target, a selected area satisfying a temperature criterion is determined. An actuator system moves a light beam relative to the instrument and measurement area to visually identify the selected area. In some embodiments the actuator system may repeatedly move the light beam to visually identify the selected area of the target as the instrument is moved and the selected area's position changes within the measurement area.

33 Claims, 7 Drawing Sheets

U.S. PATENT DOCUMENTS

| | | |
|---|---|---|
| 2005/0117624 A1 | 6/2005 | Hollander et al. |
| 2006/0114966 A1 | 6/2006 | Kienitz |
| 2006/0249679 A1 | 11/2006 | Johnson et al. |
| 2006/0289772 A1 | 12/2006 | Johnson et al. |
| 2007/0034798 A1 | 2/2007 | Hamrelius et al. |

FOREIGN PATENT DOCUMENTS

| | | |
|---|---|---|
| WO | WO02091735 A1 | 11/2002 |

OTHER PUBLICATIONS

Chinese Patent Application No. 200910209042.5, English translation of Office Action received Jul. 17, 2011, 7 pages.

Machine Translation of JP 2000-159315A, retrieved through http://www4.ipdl.inpit.go.jp/PA1/cgi-bin/PA1INIT?1175358331875 on Sep. 28, 2011, 9 pages.

* cited by examiner

TEMPERATURE MEASUREMENT INSTRUMENTS AND METHODS FOR IDENTIFYING A SELECTED TARGET AREA

BACKGROUND

Non-contact temperature measurement instruments are well known for their ability to sense infrared (IR) radiation emanating from a target in order to provide an operator with useful information about the temperature of the target. Such familiar temperature measurement instruments include, for example, devices such as single-spot IR detectors and thermal imagers employing multiple arrayed detector elements.

A non-contact temperature sensing instrument cannot always see an entire target, but receives infrared radiation from a measurement area or spot on a target within the instrument's field of view. The field of view is usually defined by properties of the instrument's infrared detector, focusing optics, and distance from the target. As the instrument is moved relative to the target, different areas of the target come within the instrument's field of view. Thus, for example, an operator can pan an instrument across a large target surface to separately view different areas of the target.

Temperature measurement instruments include a variety of feedback devices for providing temperature information. For example, a single-spot IR detector often includes a simple digital display that displays a single temperature reading for the measured target. Other instruments, such as thermal imagers, provide a more complex display, such as a liquid crystal display (LCD) or plasma image display. Such displays can allow the operator to view a complete thermal image of the target on the display.

Although these and other types of displays provide a wealth of temperature information about a target, it is not always clear how the temperature information correlates to different areas of the target. For example, an instrument with only a numerical temperature readout relies on an operator to visually correlate the temperature reading with the measured area of the target. As will be appreciated, it can be difficult to determine how temperature readings correspond to different areas of a target, because it is not always clear where the instrument is pointing.

Some temperature detectors employ one or more laser beams to aid an operator in aiming the instrument. For example, some temperature measurement instruments include a laser beam sighted along the center of the instrument's field of view. Such a laser beam can illuminate the center of the instrument's measurement spot on a target, thus allowing an operator to move the instrument and easily determine where the instrument is pointed. Other temperature detectors include a variety of laser sighting devices that allow the operator to determine the size of the instrument's measurement area on the target. For example, some instruments include sighting devices that approximately outline the measurement area so that an operator can more easily correlate the instrument's readings with the correct area of the target.

Thermal imagers or cameras with image displays provide an even greater degree of information. Images obtained using these cameras assign colors or gray-levels to the pixels composing the scene based on the intensity of the IR radiation reaching the camera's sensor elements. Thus, an operator can view the target in the infrared spectrum. However, because the resulting IR image is based on the target's temperature, and because the colors or levels displayed by the camera do not typically correspond to the visible-light colors of the scene, it can be difficult, especially for novice users of such a device, to accurately relate features of interest (e.g. hot spots) in the IR scene with their corresponding locations in the visible-light scene viewed by the operator. In applications where the infrared scene contrast is low, infrared-only images may be especially difficult to interpret.

To provide better identification of temperature spots of interest, some cameras capture a visible-light image of the scene using a separate visible-light camera built into the thermal imaging camera. Some of these thermal imaging cameras allow a user to view the visible-light image side-by-side with the infrared image. To make this comparison easier, some thermal imaging cameras now provide simultaneous viewing of the infrared image and the visible-light image overlapping each other and blended together.

Even when the infrared image and the corresponding visible-light image are overlayed and blended, identifying objects and temperature features within the images can be difficult due to, for example, low image resolution or problems in image alignment. Also, incorporating electronic displays (e.g., LCD) and/or visible-light sensors can add unneeded complexity and may be cost prohibitive in many instances. Accordingly, there exists a need for improved and/or less expensive identification systems for temperature measurement instruments.

SUMMARY

According to one aspect of the invention, a temperature measurement instrument is provided. In some embodiments of the invention, the temperature measurement instrument includes an infrared detector, a light source, an actuator system, and a programmable processor. The infrared detector is adapted to generate infrared data from infrared radiation emanating from a target within a field of view of the temperature measurement instrument. The light source generates a light beam for illuminating a selected area of the target within the field of view. The actuator system moves the light beam relative to the field of view. The processor is coupled to the infrared detector and the actuator system, and is programmed to determine from the infrared data the selected area of the target satisfying a temperature criterion and signal the actuator system to move the light beam relative to the field of view to visually identify the selected area on the target.

In some embodiments, the processor is further programmed to generate temperature data corresponding to the infrared data. The temperature criterion may be a threshold temperature or a relative temperature criterion, such a maximum or minimum temperature within the field of view.

According to another aspect of the invention, a method for identifying an area of a target viewed by an infrared sensing device is provided. The method includes imaging infrared radiation from a measurement area of a target onto an infrared detector of an infrared sensing device, generating infrared data corresponding to the infrared radiation, determining from the infrared data a selected area of the target satisfying a temperature criterion, and moving a light beam relative to the measurement area to visually identify the selected area on the target. In some embodiments, the selected area may include a single area or multiple discrete areas on the target satisfying the temperature criterion.

According to another aspect of the invention, a method for visually identifying an area of a target with a temperature sensing instrument is provided. The method includes imaging infrared radiation emanating from a target within a field of view of a temperature sensing instrument, determining a selected area of the target satisfying a temperature criterion, the selected area positioned at a first position within the field of view, visually identifying the selected area on the target with a light beam, changing a relative position of the temperature sensing instrument and the target to position the selected area at a second position within the field of view, and moving the light beam relative to the field of view to visually identify the selected area of the target at the second position. In some embodiments, the method includes moving the temperature sensing instrument by hand.

DETAILED DESCRIPTION OF THE PREFERRED EMBODIMENTS

Figure 1:
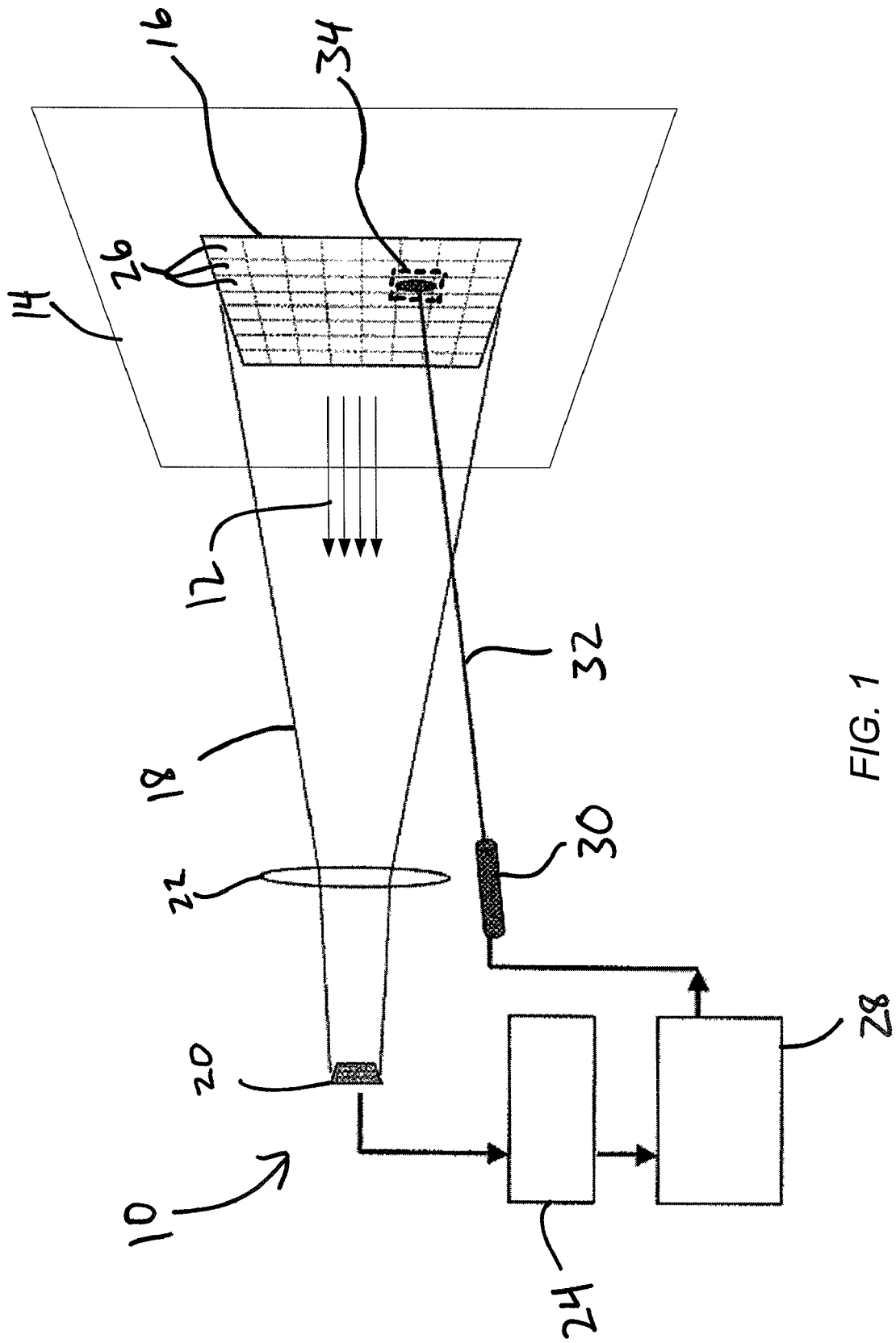
FIG. 1 is a schematic diagram of a temperature measurement instrument according to an embodiment of the invention.

The following detailed description should be read with reference to the drawings, in which like elements in different drawings are numbered identically. It will be understood that embodiments shown in the drawings and described herein are merely for illustrative purposes and are not intended to limit the invention to any embodiment. On the contrary, it is intended to cover alternatives, modifications, and equivalents as may be included within the scope of the invention as defined by the appended claims.

Referring to FIG. 1, a high-level schematic representation of a temperature measurement instrument 10 is shown according to some embodiments of the invention. The temperature measurement instrument 10 is shown receiving infrared (IR) radiation 12 emanating from a target 14. The instrument is generally capable of viewing or receiving the IR radiation 12 emanating from a measurement area 16 on the target 14, defined by a field of view 18 of the instrument. Upon receiving the IR radiation, the temperature measurement instrument 10 generates infrared data from the infrared radiation, which can provide information about one or more thermal properties of the target 14.

The target 14 is schematically represented as a square for ease of illustration; the target 14 may actually take many forms as those skilled in the art will appreciate. For example, the target 14 may include one or more relatively flat surfaces, such as portions of a building wall or ceiling. The target 14 may be a multi-dimensional object or include multiple objects or surfaces at varying distances from the temperature measurement instrument 10. The target 14 may be larger or smaller than the measurement area 16 of the temperature measurement instrument 10, depending upon the actual dimensions of the target and/or the instrument's distance from the target 14. In the most general case, the target 14 is simply an object for which temperature information is desired.

FIG. 1 includes an abstract depiction of one variation of the temperature measurement instrument 10. In the embodiment shown, the temperature measurement instrument 10 includes an IR detector 20, optics 22 for focusing the IR radiation 12 upon the detector 20, and processing electronics 24 electronically coupled to the infrared detector 20 for generating and/or processing infrared data derived from the infrared radiation 12. The optics 22 are not necessary in all cases, but if they are included may comprise one or a combination of multiple lens, mirrors, prisms, and so on.

In some embodiments the infrared detector 20 includes an array of detector elements. For example, the detector 20 may include a one-dimensional array of detector elements, or as depicted in FIG. 1, may include a two-dimensional detector array. However, the infrared detector is not restricted to a rectangular configuration or any other configuration. The IR detector 20 may be composed of a variety of detector elements (i.e., pixels), and the exact nature of the detector elements is not restricted to any particular implementation. In some cases, the infrared detector 20 may be configured as a microbolometer focal plane array (FPA).

In cases where the infrared detector 20 takes the form of a two-dimensional array, the size of the infrared detector 20 may vary. For example, in one embodiment the infrared detector 20 has a 320×240 pixel array. In another embodiment, the infrared detector 20 has an array of 160 by 120 pixels. The size of the infrared detector 20 may be larger or smaller than these examples. While larger detector arrays can provide greater resolution and more information, smaller detector arrays can provide cost savings while still providing some level of two-dimensional support. In one preferred embodiment, the infrared detector 20 includes an array having less than 100×100 pixels.

The shape and extent of the measurement area 16 imaged onto the infrared detector 20 are generally defined by the instrument's field of view 18 and the instrument's distance from the target 14. The field of view 18, in turn, is defined by the nature of the infrared detector 20 and the optics 22. With reference to FIG. 1, in some embodiments, the measurement area 16 may be divided up into a plurality of discrete areas 26. For example, each discrete area 26 may image onto a single detector element or pixel of the infrared detector 20. In some cases the discrete areas 26 may take a type of grid formation, corresponding to a two-dimensional rectangular detector array. The measurement area 16 may be defined in other ways, however. For example, the measurement area 16 may take the shape of a circle or other shape due to differing configurations of the optics 22 and/or infrared detector 20.

The processing electronics 24 coupled to the infrared detector may include a number of well-known components. For example, in some embodiments the processing electronics 24 include a programmable processor and one or more memory modules. Instructions can be stored in the memory module(s) for programming the processor to perform one or more tasks. In alternate embodiments, the processor itself may contain instructions to perform one or more tasks, such as, for example, in cases where a field programmable gate array (FPGA) or application specific integrated circuit (ASIC) are used. The processing electronics (e.g., processor) are not limited to any specific configuration. Those skilled in the art will appreciate that the teachings provided herein may be implemented in a number of different manners with, e.g., hardware, firmware, and/or software.

As shown in FIG. 1, embodiments of the invention also include an actuator system 28 and a light source 30 emitting a light beam 32 for illuminating a selected area 34 of the target 14. In general, the actuator system 28 receives a signal from the processing electronics 24 and moves the light beam 32 relative to the field of view 18 and the measurement area 16 to visually identify the selected area 34 of the target 14. As will be discussed in greater detail, the actuator system 28 may move the light beam 32 by physically moving the light source 30 or by reflecting or otherwise directing the light beam 32 after it exits the light source 30.

The light source 30 may take the form of a variety of devices that generate a light beam within the visible range of frequencies. For example, in a preferred embodiment, the light source 30 is one of a variety of laser pointers emitting a laser beam. The invention is not limited to any particular light source, though, and may incorporate sources of incoherent as well as coherent light.

In some embodiments, the actuator system 28 and light source 30 are integrated into the temperature measurement instrument 10, although this is not required. For example, as will be explained in further detail with respect to FIGS. 6-8, the actuator system 28 and light source may be mounted within the temperature measurement instrument 10 in a variety of configurations or may be externally mounted to a housing of the temperature measurement instrument 10. In some cases the actuator system 28 and light source 30 may be electrically coupled to the temperature measurement instrument 10, but may be a separate and distinct part of a temperature measurement system also including the temperature measurement instrument 10.

The actuator system 28 moves the light beam 32 to visually identify the selected area 34 of the target 14, for example, by illuminating a portion of the selected area with the light beam 32. The light beam 32 may form a dot or spot of light upon the selected area 34, may outline the selected area 34, or otherwise visually identify the selected 32 of the target 14. Thus, according to preferred embodiments of the invention, the actuator system 28 and light source/beam, coupled with the infrared detector 20 and processing electronics 24, provide a system and method for visually identifying an area of the target. By setting different desirable criteria (e.g., temperature criteria) for selecting the preferred area of the target 14, the temperature measurement instrument 10 can identify portions of the target 14 exhibiting features meeting the set criteria. Thus in some embodiments an operator using the temperature measurement instrument 10 can easily correlate temperature measurements with specific portions of the target 14.

Figure 2:
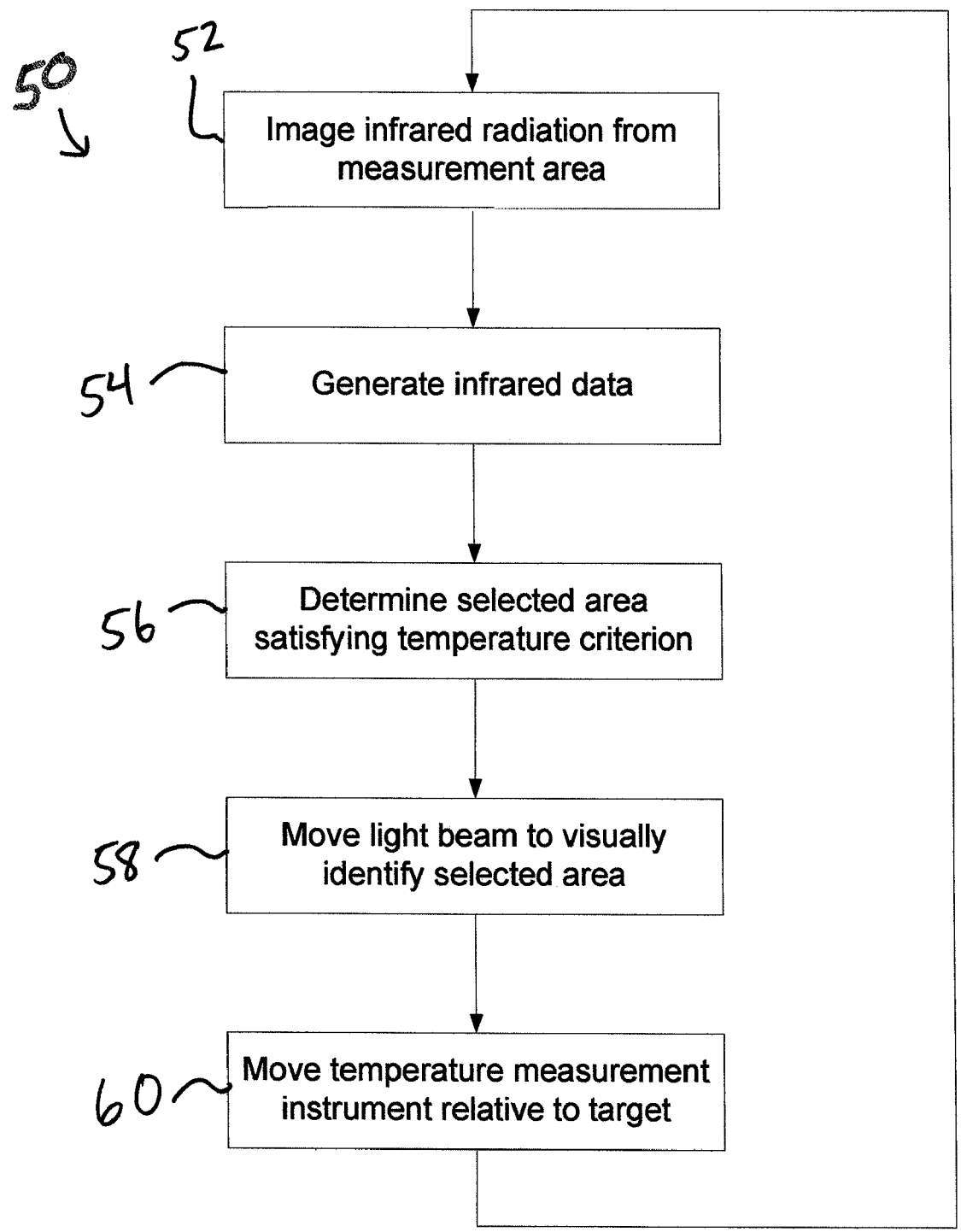
FIG. 2 is a process flow diagram illustrating a method of identifying a selected area of a thermal target according to an embodiment of the invention.

Referring now to FIG. 2, a method 50 for visually identifying an area of a target viewed by an infrared sensing device, such as the temperature measurement instrument 10 of FIG. 1, is shown. For ease of understanding, reference is made throughout the example to the embodiment in FIG. 1, although the method can be performed by other configurations of a temperature measurement instrument or system. The method begins when the temperature measurement instrument 10 points at a target 14, and images 52 infrared radiation 12 from a measurement area 16 on the target 14, defined by a field of view 18 of the temperature measurement instrument 10. The IR radiation 12 is imaged onto an IR detector 20 in the well-known way, optionally through optics 22.

Infrared data is then generated 54, either by the infrared detector 20 itself or alternately by the processing electronics 24 coupled to the infrared detector 20. For example, in one embodiment the infrared detector 20 receives the infrared radiation 12 and generates raw infrared data which is then passed on to the processing electronics 24 for post processing. The raw data and/or processed data represent thermal properties of the portion of the target 14 being imaged by the temperature measurement instrument 10 (i.e., the measurement area 16). In some embodiments the temperature measurement instrument 10 is configured as a radiometer, whereby the infrared detector 20 and the processing electronics 24 cooperate to generate absolute temperature data reflecting actual temperatures of the measurement area 16. In other embodiments, the infrared detector 20 and/or the processing electronics 24 may only generate temperature data reflecting relative temperature patterns, e.g., data indicating which portions of the target 14 are warmer or colder than others.

Returning to FIG. 2, after generating 54 infrared data, the processing electronics 24 (e.g., a programmable processor) determines 56 a selected area 34 of the target 14 satisfying a temperature criterion. For example, a processor may be programmed to analyze the infrared data to see if one or more portions of the measurement area 16 are hotter or colder than others. In some cases the temperature criterion may be a temperature threshold. For example, in some embodiments the processing electronics 24 determine if one or more portions of the measurement area 16 has a temperature rising above or below a threshold temperature. In another case, the processing electronics 24 determines which portions of the measurement area 16 on the target 14 have a temperature exceeding another area by a threshold percentage or amount. In some preferred embodiments, the temperature criterion may be a relative criterion, such as the hottest/maximum temperature or the coldest/minimum temperature exhibited within the field of view 18 or measurement area 16.

After determining 56 the selected area 34 of the target 14, the actuator system 28 moves 58 the light beam 32 to visually identify the selected area 34 on the target 14. The actuator system 28 moves the light beam 32 relative to the temperature measurement instrument 10, and thus also relative to the measurement area 16 and the field of view 18 to visually identify different areas of the measurement area 16 meeting the temperature criterion. Thus, the temperature measurement instrument 10 provides advanced capabilities over temperature measurement instruments that only include a sighting beam always illuminating the same portion of the measurement area. For example, embodiments of the invention provide greater versatility than systems such as those with laser beams only for indicating, e.g., the center of the instrument's measurement area, or the outer perimeter of the measurement area. While such systems may provide an operator with a general idea of the location of the instrument's field of view, embodiments of the invention described herein allow an operator to visually identify selected areas of the measurement area satisfying one or more temperature criteria. In addition, in some embodiments of the invention the actuator system 28 is configured to move the light beam throughout the field of view 18. Thus in some cases the light beam 32 may be used to illuminate and identify substantially any area within the measurement area 16, while previous designs merely allow identification of a single area, such as the center of the measurement area.

Embodiments of the invention also allow visual identification of a selected area 34 of a target 14 despite movement of the temperature measurement instrument 10 relative to the target 14. Referring to FIG. 2, in some cases after visually identifying the selected area 34 with the light beam 32, the temperature measurement instrument 10 may move 60 so as to change the portion of the target 14 appearing within the field of view 18 and the measurement area 16. For example, a human or a machine operator may unintentionally move the temperature measurement instrument 10 while measuring a target. It can be especially difficult for a human operator to hold a temperature measurement instrument completely stationary with one's hands while gathering temperature measurements. Movement may also be deliberate as an operator pans an instrument across a target. Alternatively, the temperature measurement instrument 10 may remain stationary and the relative position of the temperature measurement instrument 10 and the target 14 may change due to movement of the target 14.

Figure 3A:
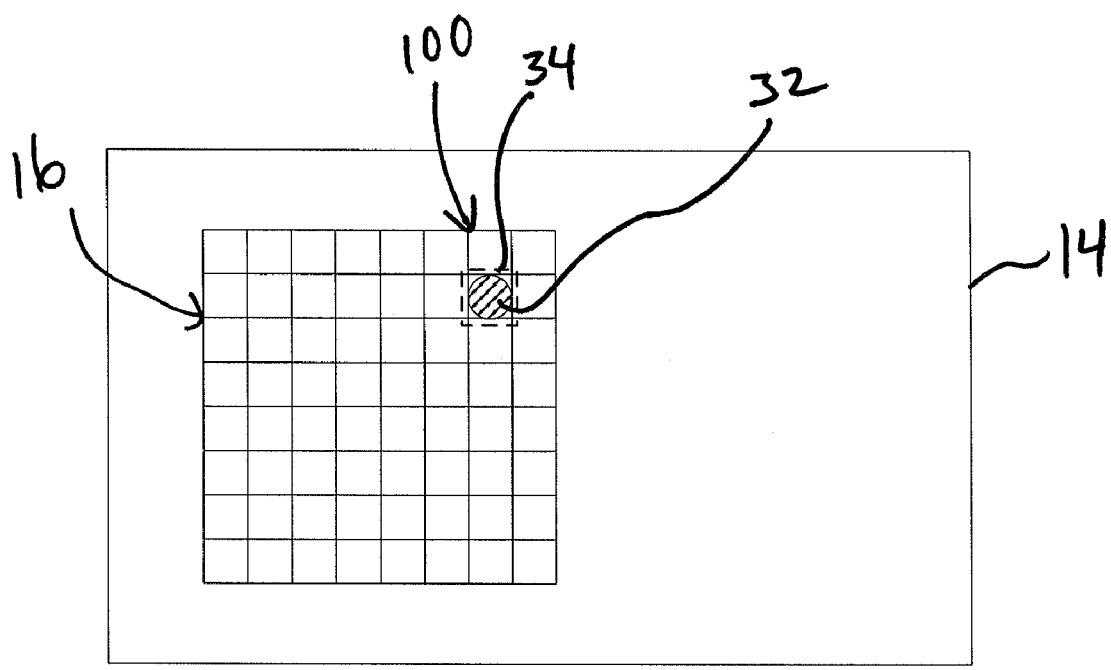
FIGS. 3A and 3B illustrate the identification of a selected area on a thermal target according to an embodiment of the invention.
Figure 3B:
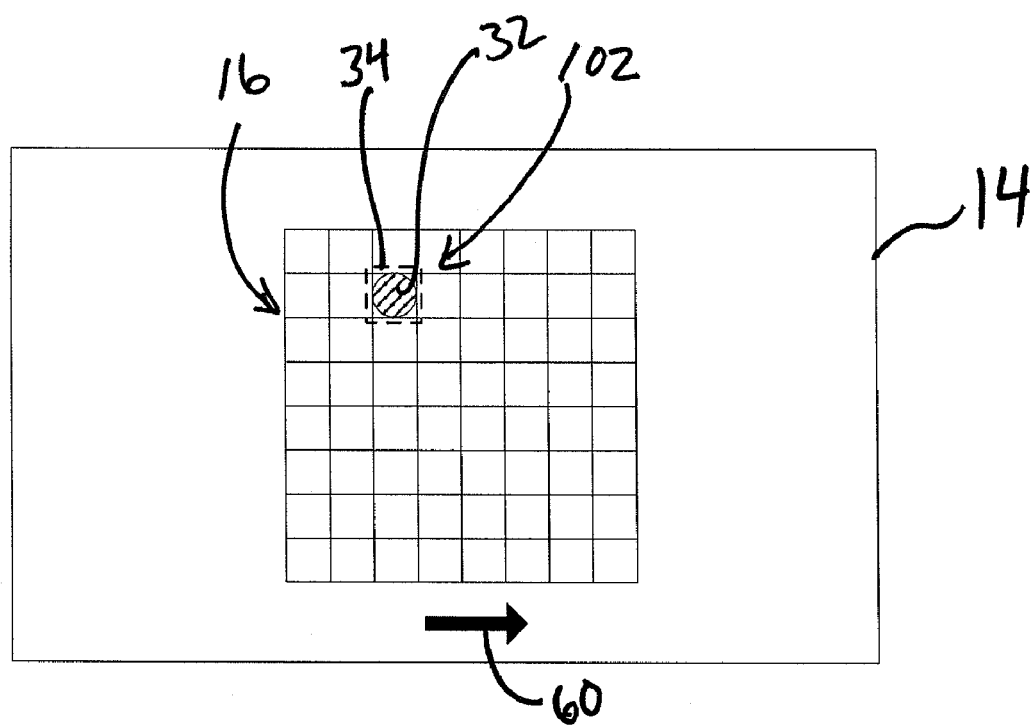

Referring to FIG. 3A, when the selected area 34 is first determined, it may be at a first position 100 within the measurement area 16 or field of view 18. After visually identifying the selected area 34 with the light beam 32, the temperature measurement instrument 10 may be moved as shown in FIG. 3B. Thus, the selected area 34 "moves" to a second position 102 with respect to the field of view 18 or measurement area 16 when a different portion of the target 14 is within the field of view 18. In this case, the selected area 34 does not move with respect to its actual location on the target 14.

After the movement shown in FIG. 3B, the selected area 34 is still within the measurement area 16, but at a second location relatively different from the first location with respect to the measurement area 16 or the field of view 18. After moving the temperature measurement instrument 10 in such a way, in some embodiments the actuator system 28 moves the light beam 32 to continue identifying the selected area 34 at the new, second position 102 within the field of view. Accordingly, in some embodiments, the actuator system 28 moves the light beam 32 to continually identify the selected area 34 despite movement of the temperature measurement instrument 10. In this way, embodiments of the invention allow an operator to visually identify a selected area of a target meeting a temperature criterion, e.g., the hottest or coldest spot, even if the temperature measurement instrument 10 moves slightly with respect to the target 14.

In some cases the temperature measurement instrument 10 may repeatedly move the light beam 32 to identify the selected area 34 until the selected area 34 moves outside the field of view 18 or measurement area 16. With respect to FIG. 2, in some embodiments the processing electronics 24 are programmed to continually perform the method 50 of identifying the selected area 34 (e.g., at repeating intervals), so that if the temperature measurement instrument 10 is moved 60, the processing electronics 24 will either identify the previously selected portion of the target 14 as the "selected area" 34, or possibly identify a new portion of the target 14 as the "selected area" 34. For example, in cases where the temperature criterion is a maximum temperature within the field of view 18, the actuator system 28 will repeatedly move the light beam 32 to visually identify the hottest spot of the target 14 within the field of view 18.

In one preferred embodiment, the processing electronics 24 and the actuator system 28 cooperate to move the light beam at visually imperceptible frequencies. For example, the temperature measurement instrument 10 may perform an iteration of the method of FIG. 2 after a period of only a few milliseconds or microseconds. In some embodiments, the actuator system 28 employs one or more servo motors to quickly move the light beam 32. For example, the actuator system 28 may include one motor for moving the light beam 32 in a vertical or elevation direction, and another motor for moving the light beam 32 in a horizontal or azimuth direction.

The processing electronics 24 may store the present position of the light beam 32 and then calculate the motor movements and send corresponding control signals to the actuator system 28 to reposition the light beam 32 when necessary. Alternatively, in some embodiments, the actuator system 28 may include its own processing electronics. In this case, the processing electronics 24 may only determine the position of the selected area 34 with respect to the measurement area, and then the actuator system 28 may calculate the movements necessary to reposition the light beam 32 to illuminate the selected area 34.

Referring again to FIGS. 3A and 3B, in some embodiments, the selected area 34 may include a single area on the target 14 satisfying the defined temperature criterion. For example, in the embodiment shown in FIGS. 3A and 3B, the selected area 34 corresponds to a single discrete area 26 corresponding to a single detector element or pixel of the infrared detector 20.

Figure 4A:
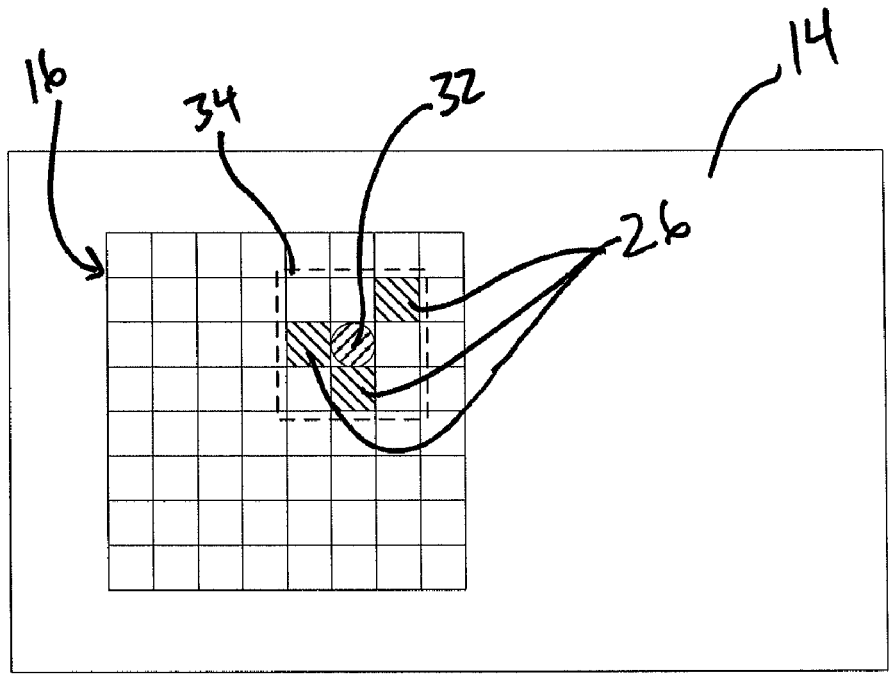
FIGS. 4A and 4B illustrate the identification of a selected area on a thermal target including a plurality of discrete areas according to an embodiment of the invention.
Figure 4B:
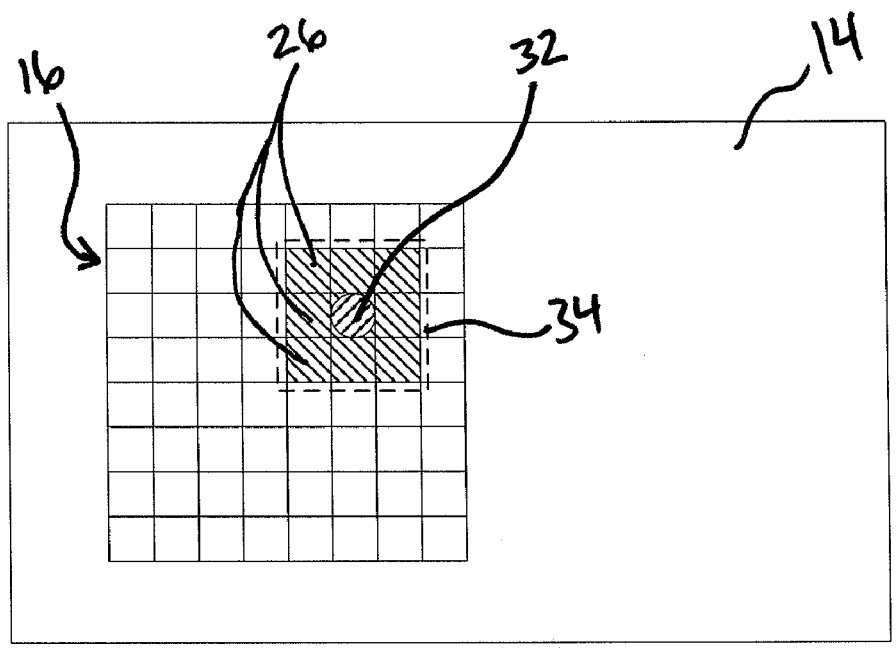

Referring briefly to FIG. 4B, in another example, the single area may include a plurality of contiguously positioned discrete areas 26. For example, when imaging a target such as an electrical panel, the resolution of the infrared detector 20 may be great enough to image a single component having a constant temperature over several pixels. The infrared data generated from these several pixels may all satisfy the temperature criterion, and thus, the selected area 34 may be determined as including all of them.

As shown in FIG. 4A, in some cases the selected area 34 may include a plurality of noncontiguous discrete areas. For example, several different components on an electrical panel may meet the temperature criterion. In such a case, the selected area 34 may be determined to include all such discrete areas meeting the temperature criterion.

The light source 30 and the actuator system 28 may be configured to visually identify the selected area 34 in a variety of manners. For example, when a single area of the target is determined as the selected area, the temperature measurement instrument 10 may simply illuminate the center of the single area to visually identify the selected area 34. See, for example, the embodiments shown in FIGS. 3A and 3B. Referring to FIGS. 4A and 4B, when multiple discrete areas (contiguous or noncontiguous) are determined to be within the selected area 34, the temperature measurement instrument 10 may illuminate an approximate center of the selected area 34, or may increase the size (e.g., diameter) of the light beam 32 to simultaneously illuminate more than one discrete area 26 within the selected area 34. However the invention is not limited to any particular illumination scheme, and a variety of implementations may be used. As just one example of an alternative scheme, the actuator system 28 may move the light beam 32 in such a way so as to outline the selected area 34.

Figure 5:
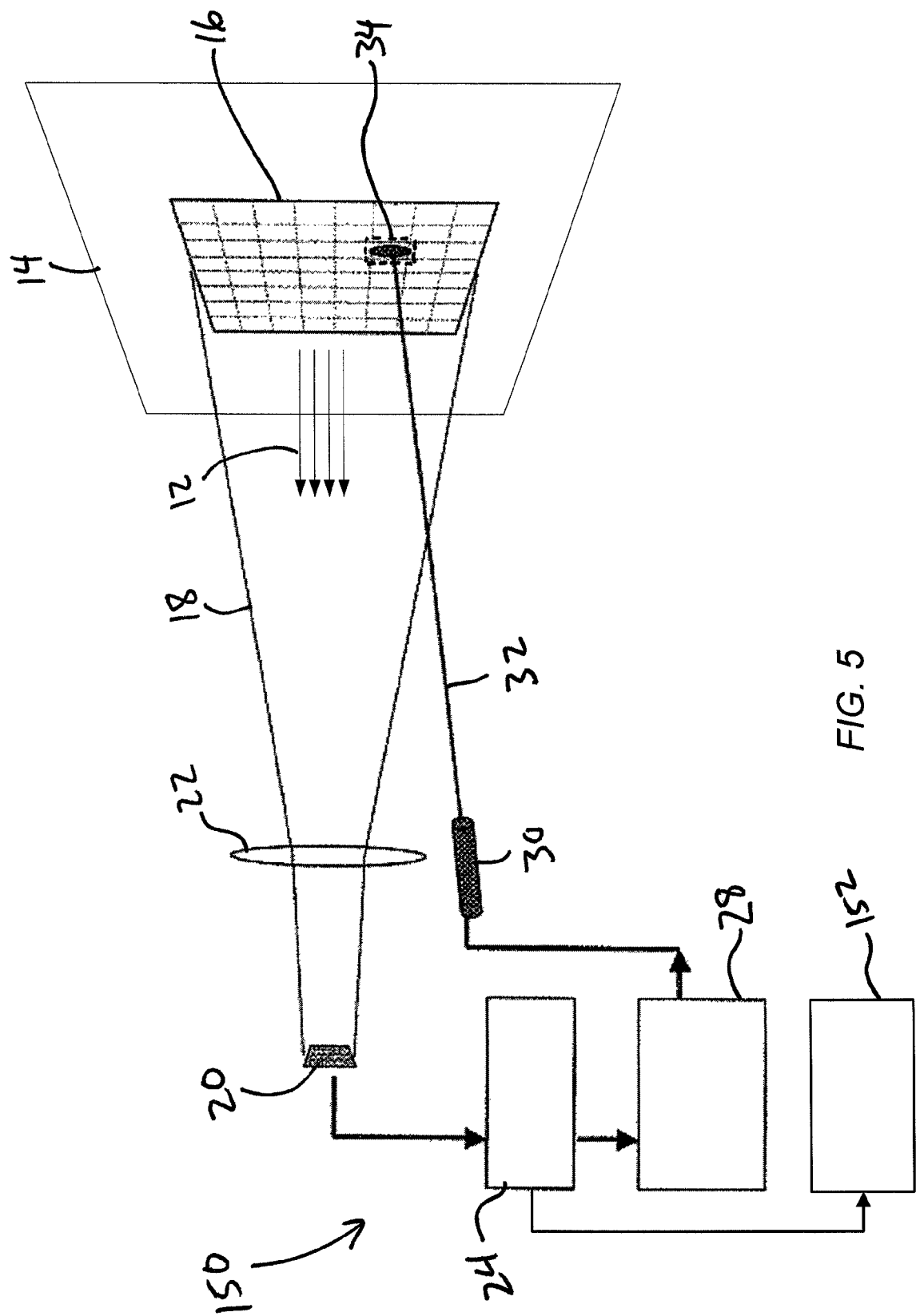
FIG. 5 is a schematic diagram of a temperature measurement instrument according to an embodiment of the invention.

Thus, embodiments of the invention provide for visually identifying, upon the target itself, selected areas of the target meeting a temperature criterion. Referring now to FIG. 5, in some embodiments, a temperature measurement instrument 150 is provided which includes an electronic display 152, such as a CRT, LCD, OLED, or plasma display. In these embodiments, the processor of the temperature measurement instrument 150 may be further programmed to display an image (e.g., thermal and/or visible) of the measurement area 16 on the display 152. In addition to visually identifying the selected area 34 upon the target 14 itself, the processor may be programmed to identify the selected area upon the electronic display 152. Thus, embodiments of the invention can provide multiple ways to identify a selected area of a target.

While a display 152 may be included in some embodiments, in some preferred embodiments, a temperature measurement instrument does not include an electronic image display, such as an LCD or plasma display. Instead of displaying an image of the measurement area 16 to identify selected areas meeting a temperature criteria, in one preferred embodiment, visually identifying the selected area 34 with the light beam 32 is the only manner in which the selected area 34 is identified. Accordingly, selected areas of the target 14 may be identified without the need for an image display 152, thus advantageously reducing the cost and the complexity of some temperature measurement instruments.

Figure 6:
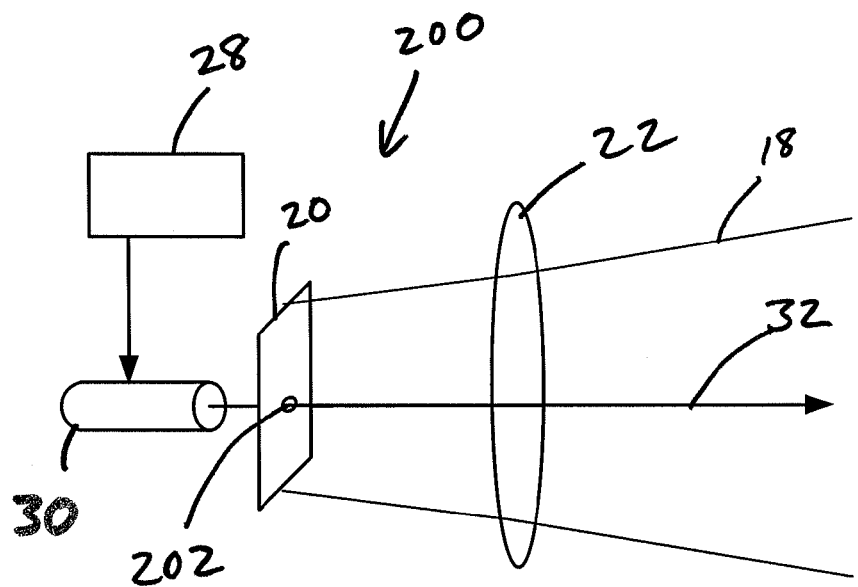
FIG. 6 is a schematic diagram of a temperature measurement instrument according to an embodiment of the invention.
Figure 7:
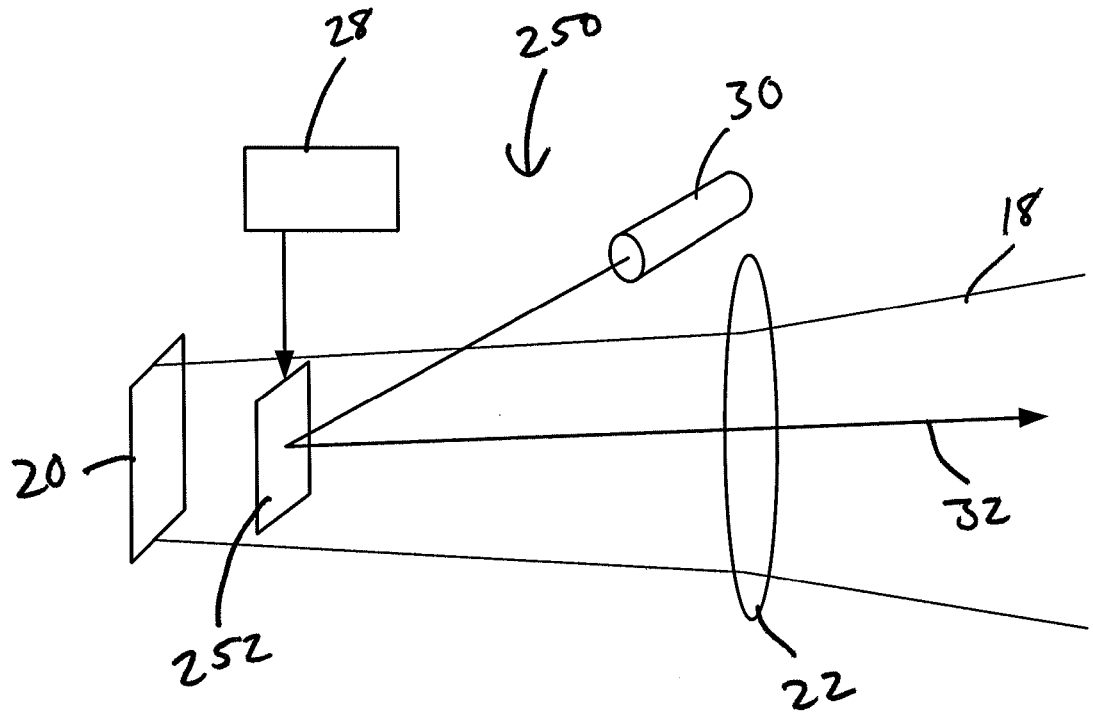
FIG. 7 and FIG. 8 are schematic diagrams of a temperature measurement instrument according to an embodiment of the invention.
Figure 8:
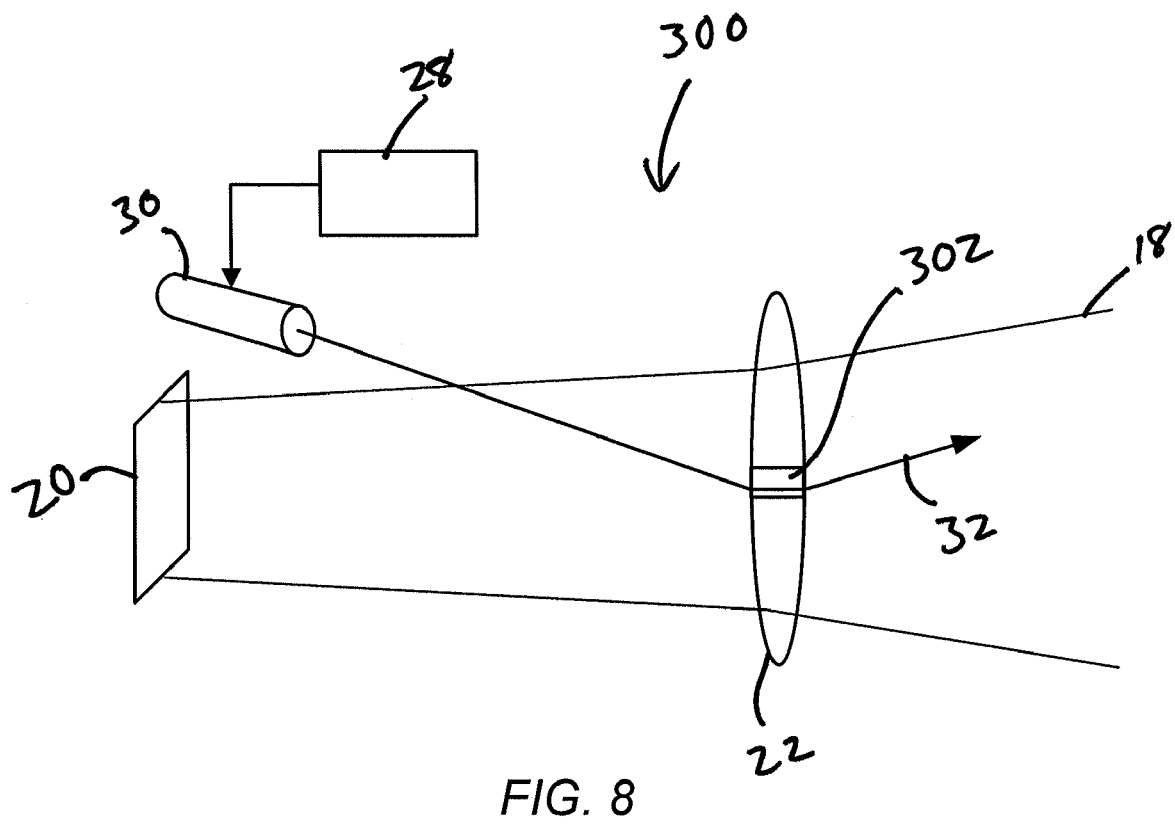

Referring now to FIGS. 6-8, the actuator system 28 and the light source may be configured in a variety of ways to provide the light beam 32 for illuminating the selected area 34. For instance, in one embodiment, shown in FIG. 6, a temperature measurement instrument 200 may be provided with a coaxially-aligned light source 30, either behind or in front of the infrared detector 20. In cases where the light source is provided behind the infrared detector 20, the infrared detector 20 may be configured with a central aperture 202, which allows the light beam 32 to pass through the infrared detector 20. The size of the aperture 202 and the distance between the light source 30 and the infrared detector 20 and the optics 22 may be dimensioned to provide an adequate angle of movement to allow the light beam 32 to reach substantially all portions of the measurement area.

Referring briefly to FIGS. 1 and 5, in some cases the light source 32 may be positioned slightly off-axis from the infrared detector 20 and/or optics 22. For example, the light beam 32 may be mounted to the exterior housing of the temperature measurement instrument. In such a case, the offset angle may be small enough to effectively be ignored. Alternatively, the processing electronics 24 and/or actuator system 28 may be programmed to calculate a parallax error due to the offset between the light beam 32 and the field of view 18.

FIG. 7 illustrates, according to one embodiment, a temperature measurement instrument 250 incorporating a mirror 252 configured to reflect and move the light beam 32 from the light source 30. For example, the mirror 252 may be a partially transparent mirror, reflecting the visible light beam 32, while letting infrared radiation pass through to the infrared detector. The actuator system 28 may be coupled directly to the mirror 252 to adjust the angle of incidence of the light beam hitting the mirror in order to illuminate the selected area on the target.

FIG. 8 illustrates another embodiment of the invention, including a temperature measurement instrument 300 including an offset light source 30 and an optical element 302 within the optics 22 for coaxially directing the light beam 32. For example, the optical element 302 may be a prism embedded within the optics 22. The actuator system 28 in this case is configured to move the light source 30 taking into account the refraction of the light beam 32 through the prism 302. Thus the actuator system 28 can move the light beam 32 in order to visually identify a selected area on the target.

Thus, embodiments of the TEMPERATURE MEASUREMENT INSTRUMENTS AND METHODS FOR IDENTIFYING A SELECTED TARGET AREA are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A temperature measurement instrument comprising:
   an infrared detector adapted to generate infrared data from infrared radiation emanating from a target within a field of view of the temperature measurement instrument;
   a light source adapted to generate a light beam for illuminating a selected area of the target within the field of view;
   an actuator system adapted to move the light beam relative to the field of view; and
   a processor coupled to the infrared detector and the actuator system, the processor programmed to determine from the infrared data the selected area of the target satisfying a temperature criterion and signal the actuator system to move the light beam relative to the field of view to visually identify the selected area on the target.

2. The temperature measurement instrument of claim 1, wherein the processor is further programmed to generate temperature data corresponding to the infrared data.

3. The temperature measurement instrument of claim 2, wherein the temperature criterion is a threshold temperature.

4. The temperature measurement instrument of claim 1, wherein the temperature criterion is a relative temperature criterion.

5. The temperature measurement instrument of claim 4, wherein the temperature criterion is a maximum temperature within the field of view.

6. The temperature measurement instrument of claim 4, wherein the temperature criterion is a minimum temperature within the field of view.

7. The temperature measurement instrument of claim 1, wherein the selected area comprises a single area on the target satisfying the temperature criterion.

8. The temperature measurement instrument of claim 1, wherein the selected area comprises a plurality of discrete areas on the target satisfying the temperature criterion.

9. The temperature measurement instrument of claim 8, wherein two or more of the plurality of discrete areas are contiguous.

10. The temperature measurement instrument of claim 8, wherein the processor is further programmed to signal the actuator system to move the light beam to visually identify an approximate center of the plurality of discrete areas.

11. The temperature measurement instrument of claim 1, further comprising a display, wherein the processor is further programmed to display an image of the target on the display and identify the selected area on the image.

12. The temperature measurement instrument of claim 1, wherein visually identifying the selected area with the light beam is the only manner in which the selected area is identified.

13. The temperature measurement instrument of claim 1, wherein the actuator system is adapted to move the light beam throughout the field of view.

14. A method for identifying an area of a target viewed by an infrared sensing device, comprising:
   imaging infrared radiation from a measurement area on a target onto an infrared detector of an infrared sensing device, the measurement area on the target defined at least in part by a field of view of the infrared sensing device;
   generating infrared data corresponding to the infrared radiation;
   determining from the infrared data a selected area of the target satisfying a temperature criterion; and moving a light beam relative to the field of view and the measurement area to visually identify the selected area on the target.

15. The method of claim 14, wherein the selected area comprises a single area on the target satisfying the temperature criterion.

16. The method of claim 14, wherein the selected area comprises a plurality of discrete areas on the target satisfying the temperature criterion.

17. The method of claim 16, wherein two or more of the plurality of discrete areas are contiguous.

18. The method of claim 16, further comprising moving the light beam to visually identify an approximate center of the plurality of discrete areas.

19. The method of claim 14, wherein the temperature criterion is a threshold temperature.

20. The method of claim 14, wherein the temperature criterion is a relative temperature criterion.

21. The method of claim 20, wherein the temperature criterion is a maximum temperature for the measurement area.

22. The method of claim 20, wherein the temperature criterion is a minimum temperature for the measurement area.

23. A method for visually identifying an area of a target with a temperature sensing instrument, comprising:
   imaging infrared radiation emanating from a target within a field of view of a temperature sensing instrument;
   determining a selected area of the target satisfying a temperature criterion, the selected area positioned at a first position within the field of view;
   visually identifying the selected area on the target with a light beam;
   changing a relative position of the temperature sensing instrument and the target to position the selected area at a second position within the field of view; and
   moving the light beam relative to the field of view to visually identify the selected area of the target at the second position.

24. The method of claim 23, further comprising moving the temperature sensing instrument by hand.

25. The method of claim 23, further comprising moving the target with respect to the temperature sensing instrument.

26. The method of claim 23, wherein the temperature criterion is a threshold temperature.

27. The method of claim 23, wherein the temperature criterion is a relative temperature criterion.

28. The method of claim 27, wherein the temperature criterion is a maximum temperature for the measurement area.

29. The method of claim 27, wherein the temperature criterion is a minimum temperature for the measurement area.

30. The method of claim 23, wherein the selected area comprises a single area on the target satisfying the temperature criterion.

31. The method of claim 23, wherein the selected area comprises a plurality of discrete areas on the target satisfying the temperature criterion.

32. The method of claim 31, wherein two or more of the plurality of discrete areas are contiguous.

33. The method of claim 31, further comprising moving the light beam to visually identify an approximate center of the plurality of discrete areas.

* * * * *